United States Patent [19]
Langhorst et al.

[11] Patent Number: 5,915,306
[45] Date of Patent: Jun. 29, 1999

[54] GENERATOR MOUNTING ASSEMBLY

[75] Inventors: Phil Langhorst, St. Louis, Mo.;
Donald E. Merz, Granite City, Ill.;
Paul F. O'Connor, St. Simons, Ga.

[73] Assignee: MagneTek, Inc., Nashville, Tenn.

[21] Appl. No.: 08/856,868

[22] Filed: May 15, 1997

[51] Int. Cl.$^6$ .................................................... B61C 3/02
[52] U.S. Cl. ..................... 105/157.1; 105/35; 105/136; 105/54; 322/1; 310/75 R; 310/91; 290/3
[58] Field of Search ................................. 105/35, 54, 55, 105/133, 136, 137, 218.1, 219, 220, 221.1, 96.1; 322/1; 310/66, 67 R, 75 R, 79, 91; 290/3

[56] References Cited

U.S. PATENT DOCUMENTS

| | | | |
|---|---|---|---|
| 1,145,468 | 7/1915 | Creveling | 322/1 |
| 4,165,466 | 8/1979 | Stikkers | 290/3 |
| 4,377,975 | 3/1983 | Scott et al. | 105/133 |
| 4,539,497 | 9/1985 | Boyer | 310/75 R |
| 4,766,816 | 8/1988 | Fukada | 104/172.4 |
| 4,937,581 | 6/1990 | Baldwin | 342/44 |
| 5,132,687 | 7/1992 | Baldwin | 342/44 |
| 5,261,842 | 11/1993 | Hinkel | 322/1 |
| 5,345,878 | 9/1994 | Jacob | 105/136 |
| 5,775,229 | 7/1998 | Folk et al. | 105/54 |

*Primary Examiner*—Mark T. Le
*Attorney, Agent, or Firm*—Waddey & Patterson; Mark J. Patterson

[57] ABSTRACT

A mounting assembly secures a generator and facilitates attachment to a railroad railcar on the end of the railcar axle. The generator produces electricity from the axle of a railroad railcar while it is traveling on a railroad track. A generator is mounted with a generator bracket and a backing plate to an existing bearing adapter on the railcar. A drive hub engages axle bolts on the railcar axle. As the railcar axle turns, the drive hub turns and with the drive hub connected to a generator the generator subsequently rotates to supply electricity to the railcar. Different types of generators can be attached with the mounting assembly to the railcar. The mounting assembly allows generators to be mounted without modification to the existing railcar structure.

19 Claims, 5 Drawing Sheets

GENERATOR MOUNTING ASSEMBLY

BACKGROUND OF THE INVENTION

This invention relates to a generator for producing electricity from the rotating axle of a railroad car while it is traveling on a railroad track. More specifically, it relates to a mounting assembly that contains the generator and facilitates attachment to the railcar by interfacing with the railcar's bearing adapter.

Various methods are known for supplying power to a railroad car. The most common method is to run an electric cable between each car, with the power source located in the locomotive. This is commonly done for passenger trains. The disadvantage of cables is that when a cable breaks or a connection between the cars fails, power is lost to all of the subsequent railcars. Cables generally are used to transmit high levels of power. Trains that are hauling freight typically do not have electrical power supplied to each freight car as none is usually required. Recent technological advances have made possible equipping railroad freight cars with useful devices. For example, a railcar can be equipped with a global positioning unit and transmitter to relay its position to receivers along the track. A railcar can also be equipped with sensors and transmitters to detect the condition of the cargo or wheel bearings. Data from each railcar can be relayed by RF signals to the locomotive. A railcar can be equipped with an electrically actuated braking unit. These devices require a reliable source of power located on each railcar. Reliability is very important as the devices will have to work in a environment with extreme vibration, thermal fluctuations, dirt and exposure to outside weather. A preferred installation would utilize a battery which is periodically recharged by some type of generator.

U.S. Pat. Nos. 4,937,581 and 5,132,687 show a system for generating power to charge a battery in a railcar. An inertial energy generator is shown in FIG. 2 of U.S. Pat. No. 4,937,581 in which a mass deflects a shaft to which a piezoelectric material is bonded to generate an AC voltage. This approach is only able to produce very small wattage levels. Further, it may not produce any wattage in railcars that are traveling at low speed in which the mass is not sufficiently displaced.

A different approach is shown in U.S. Pat. No. 4,766,816. This patent shows a generator driven by a trolley chain. The generator produces power whether the car is moving or stationary as the trolley chain is in continuous motion. This approach would not work with a railroad car and track.

A current unmet need exists for a simple device for connection to existing railroad cars to provide a reliable source of electrical power to each railcar.

SUMMARY

An object of the invention is to allow a railcar to generate its own electricity to power equipment contained within the railcar. A generator is mounted with brackets to an existing bearing adapter on the railcar. A drive hub engages bolts on the railcar axle. As the railcar axle turns, the drive hub turns and with the drive hub connected to a generator the generator subsequently rotates to generate electricity. Another object of the invention is to allow mounting of different generators to the railcar. Different generators may be required depending upon whether AC or DC power is needed and for varying the output level of the generator. Another object of the invention is to allow generators to be mounted on any existing railcar with a common set of components. Another object of the invention is to allow the mounting of the generator to the existing railcar without the disassembly of any components of the railcar, including the bearing bolts. In an alternative embodiment of the invention, the generator mounting bracket and the railcar bearing adapter are formed as one piece.

A generator mounting assembly for holding a generator adjacent to a first end of an axle. The generator is mounted in relation to the axle so as to receive rotational energy from the axle as it rotates. The generator mounting assembly is attached to a bearing adapter. The bearing adapter being disposed between a bearing and a sideframe. The generator produces electricity as the axle rotates. A generator bracket is connected adjacent to a first side of the bearing adapter. The generator is connected to the generator bracket. A backing plate is connected adjacent to a second side of the bearing adapter. Fasteners connect the generator bracket and the backing plate to the bearing adapter. The fasteners hold the generator mounting assembly to the bearing adapter. A drive hub is connected to the generator. The drive hub engages the first end of the axle such that as the axle rotates the drive hub rotates and turns the generator. In one embodiment of the invention, a generator shaft is attached to the generator and a flexible shaft coupling is connected between the drive hub and the generator shaft. The flexible shaft coupling allows for mis-alignment between the generator shaft and the first end of the axle when the axis of rotation of the axle is different than the axis of rotation of the generator shaft.

DETAILED DESCRIPTION

Figure 1A:
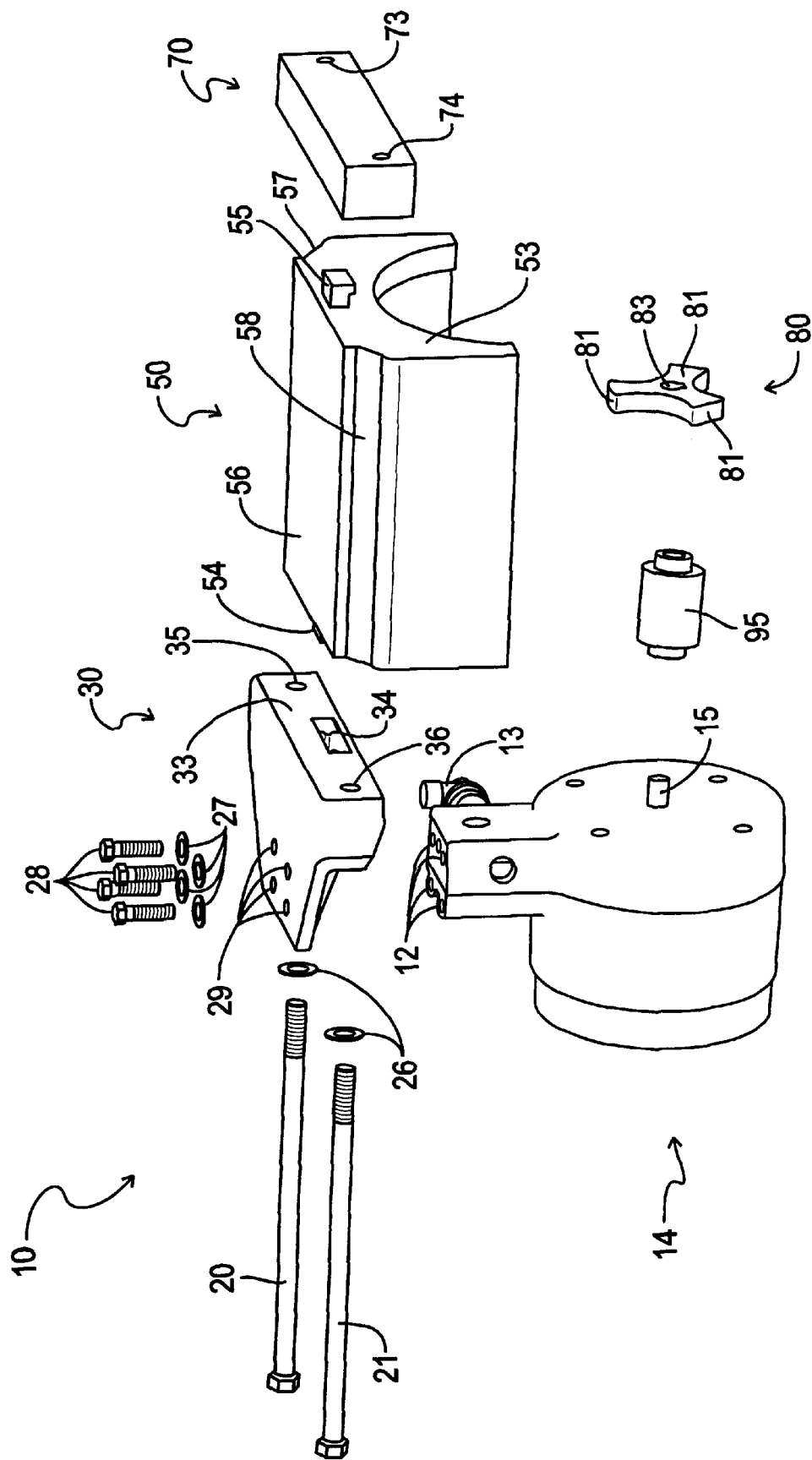
FIG. 1A is an exploded top perspective view of the railcar generator assembly showing how it is mounted in relation to the bearing adapter of the railcar.
Figure 3:
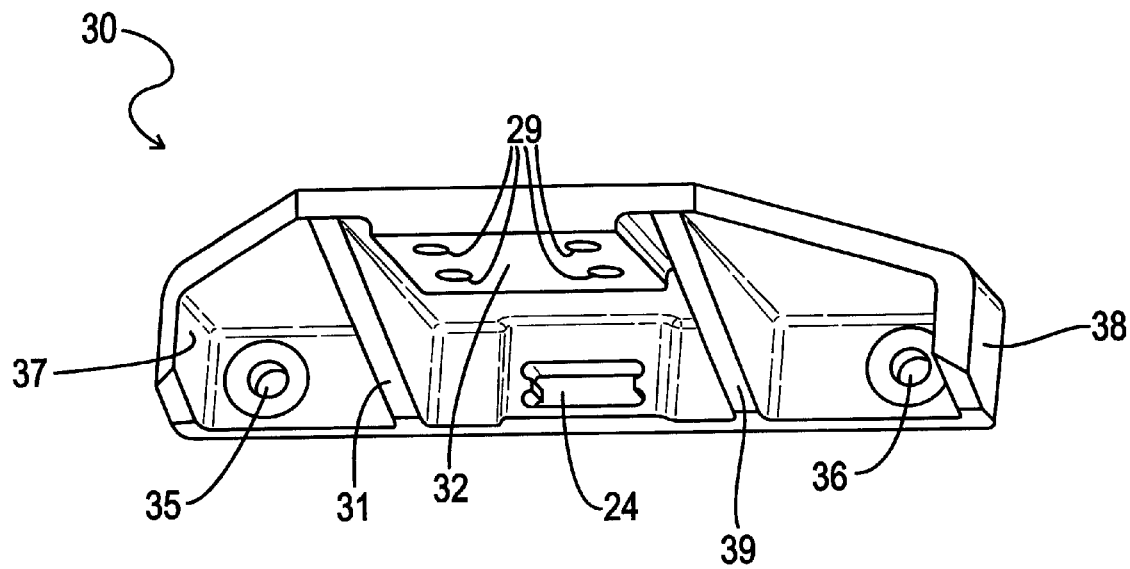
FIG. 3 is a perspective view of the generator bracket.

FIG. 1A shows a top exploded view of the railcar generator assembly showing how it is mounted in relation to the bearing adapter of the railcar. A railcar generator assembly 10 has a generator bracket 30 for holding and supporting a generator 14. The generator 14 is bolted to the generator bracket 30 by four bolts 28 which pass through holes 29 in the generator bracket 30 and into tapped holes 12 in the generator 14. Washers 27 are used with the bolts 28. The generator 14 has a generator shaft 15 and a connector 13. FIG. 3 shows the generator mounting surface 32 on which the generator 14 fits to the generator bracket 30. Referring back to FIG. 1, the generator bracket 30 has a side 33 which is mounted adjacent to a side 52 of the bearing adapter 50, the bearing adapter 50 is a normal component of the railcar. The bottom of the bearing adapter 50 goes over and contains the top of the railcar wheel bearing. A projection 54 extending from the top 56 of the bearing adapter 50 mates with a slot 34 on the generator bracket 30. The projection 54 when engaged with slot 34 holds the completed assembly in position.

Figure 2:
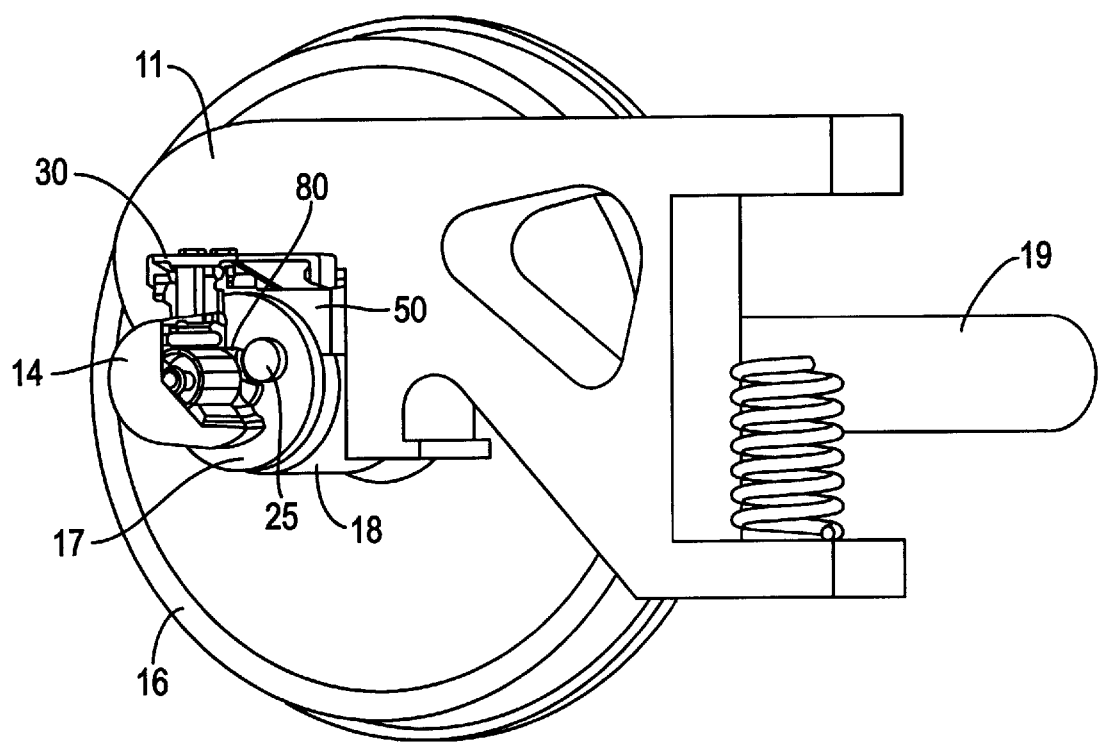
FIG. 2 is a view showing how the railcar generator assembly is mounted in relation to the railcar axle and wheel assembly.

A backing plate 70 is mounted adjacent to side 53 of the bearing adapter 50. A projection 55 extending from the top 56 and side 53 of the bearing adapter mates with a slot 72 on the backing plate. Similarly, projection 55 when engaged with slot 72 holds the completed assembly firmly in position. The generator bracket 30 and the backing plate 70 are held to the bearing adapter 50 by fasteners 20 and 21. Washers 26 are used with fasteners 20 and 21. Fasteners 20 and 21 fit into steps 57 and 58 on the bearing adapter. Steps 57 and 58 allow the fasteners to connect with the backing plate 70 over the bearing adapter 50. In FIG. 2, it can be seen that railcar sideframe 11 fits over and rests on the bearing adapter 50. The sideframe 11 holds the railcar wheel and axle assembly. The steps 57 and 58 in bearing adapter 50 allow the fasteners 20 and 21 to pass through between the bearing adapter 50 and the sideframe 11. Referring back to FIG. 1A, fasteners 20 and 21 preferably are ½ inch bolts which pass through apertures 35 and 36 on the generator bracket and pass through apertures 73 and 74 respectively on the backing plate 70. Apertures 73 and 74 are tapped and mate with threads on fasteners 20 and 21. The bearing adapter is metal and has a rough surface. A filler material (not shown) is preferably applied between the mounting bracket and the bearing adapter. This filler helps to spread the load over the interface area between the rough surface of the bearing adapter and the smooth surface of the mounting bracket.

A drive hub 80 has a hole 83 through which is connected the generator shaft 15. The drive hub 80 has three yokes 81 for engagement with three bolts 25 (one of which is shown in FIG. 2) on the end of the railcar axle.

Figure 1B:
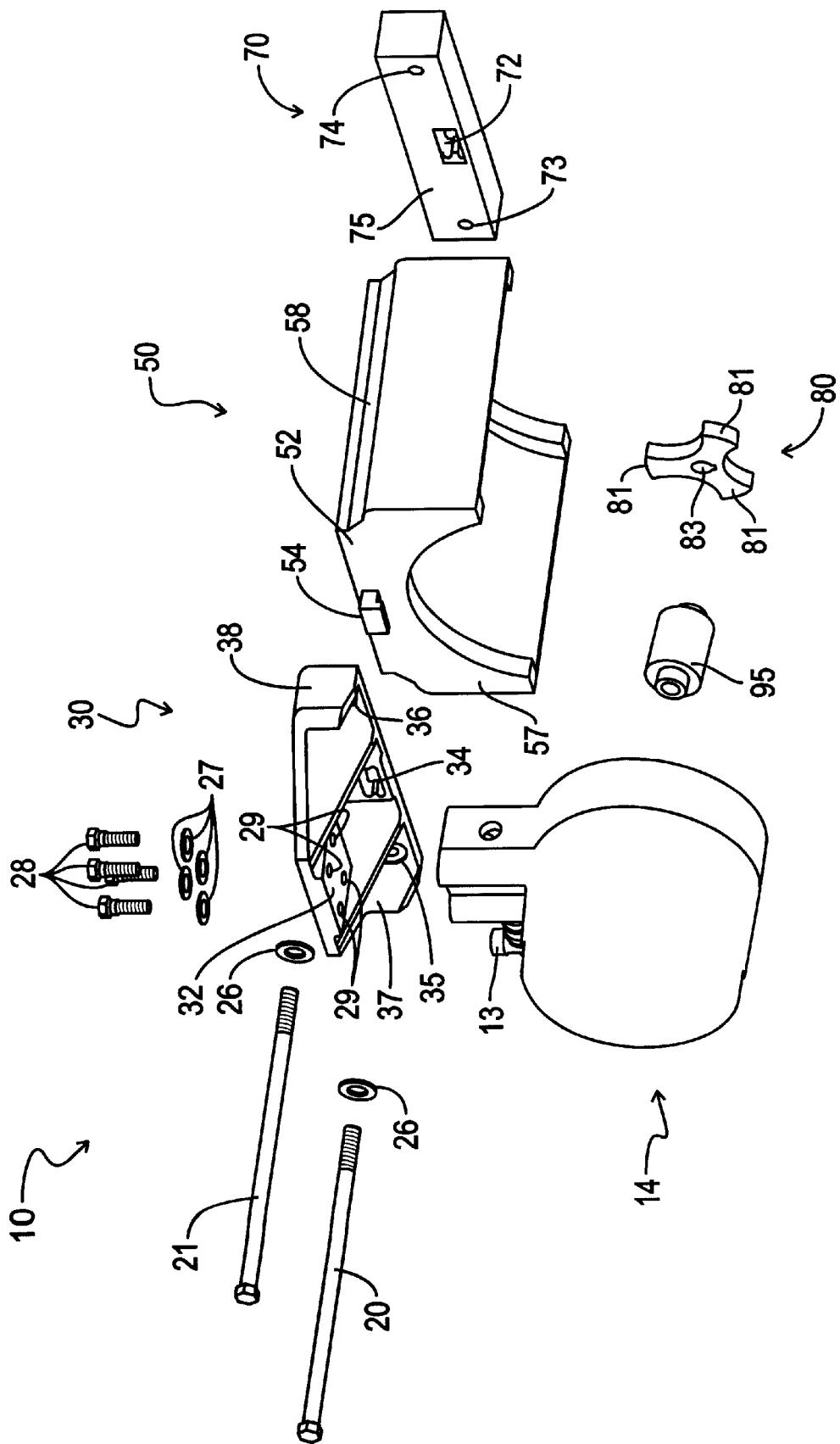
FIG. 1B is an exploded bottom perspective view of the railcar generator assembly showing how it is mounted in relation to the bearing adapter of the railcar.

FIG. 1B shows a bottom exploded view of the railcar generator assembly showing how it is mounted in relation to the bearing adapter of the railcar. In FIG. 1B, additional details of the backing plate and generator bracket can be seen. The backing plate 70 has a side 75 which mates with the side 53 of the bearing adapter 50. The generator bracket 30 has a mounting surface 32 which is adjacent to the generator 14. The generator bracket 30 further has outer stiffening members 37 and 38.

This system has the flexibility to be able to mount to various bearing adapters with differing dimensions that are currently in use on existing railcars. The present invention also allows the mounting of different generators to the railcar. Different generators may be required by different installations depending upon whether AC or DC power is needed and for varying the output of the generator.

Figure 4:
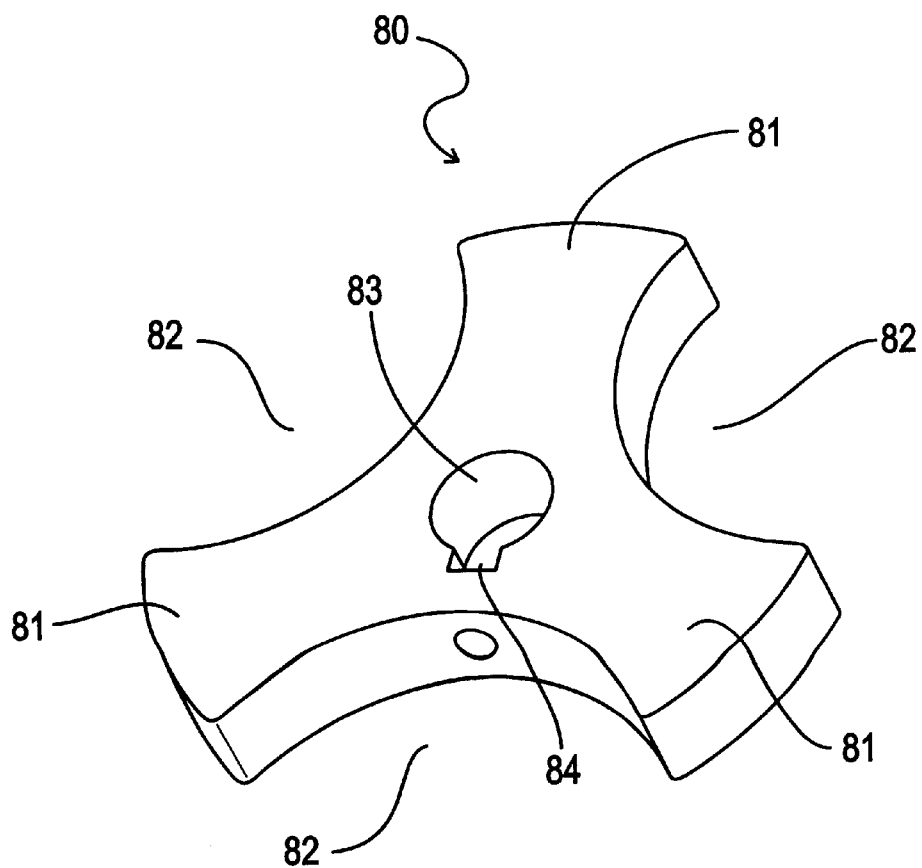
FIG. 4 is a perspective view of the drive hub.
Figure 5:
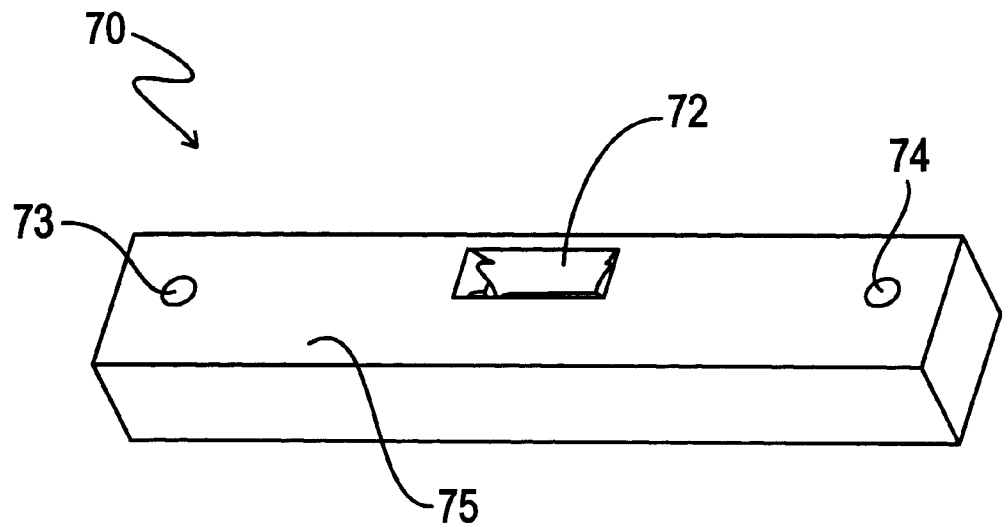
FIG. 5 is a perspective view of the backing plate.

FIG. 2 shows how the railcar generator assembly 10 is mounted in relation to the railcar axle and wheel assembly. In FIG. 2, the bottom of the bearing adapter 50 goes over and contains the top of the wheel bearing 18. A railcar axle 19 passes through the railcar wheel 16 and through the wheel bearing 18. Bolts 25 hold a bearing cap 17 over the wheel bearing 18 to the axle 19. The drive hub 80 engages the railcar axle bolts 25. There are several common sizes of railcar axle assemblies. Each of these has different bolt and bearing cap sizes. Other protrusions on the axle end may exist on some railcar designs besides the axle bolts that the drive hub could engage. Railcar axle 19 has railcar axle bolts 25 on each end. Details of the drive hub are best seen in FIG. 4. The drive hub 80 has three yokes 81 for engagement with the railcar axle bolts 25. The area between the yokes 81 define an area called the drive hub cavity 82. The axle bolts 25 fit into the cavity 82. The yokes 81 and the cavity 82 are sized to work with different sized bolts and bearing caps from the railcar axle and wheel assemblies. The drive hub 80 has a hole 83 drilled through it with a keyway 84 for attachment to the generator shaft 15.

The yokes 81 are designed to allow a larger distance to exist between the yoke 81 and the bolt 25 than is required just to fit. This extra space allows the drive hub to be compliant with the axle shaft. When the axis of rotation of the generator shaft and drive hub is not the same as the axis of rotation of the railcar axle, the drive hub 80 and bolts 25 will effectively slide back and forth on each other in the direction perpendicular to the axis of rotation as they rotate. Designing a larger space between the yoke 81 and the bolt 25 allows this sliding between the parts to occur. If the sliding is constrained, the result would be broken parts in the assembly. This system will work with a misalignment of the centers of rotation of the axle and the drive hub. An alternative method for dealing with the misalignment of the centers of rotations of the railcar axle and the drive hub is to use a flexible shaft coupling. A flexible shaft coupling 95 is shown in FIGS. 1A and 1B. The flexible shaft coupling 95 is connected between the generator 14 and the drive hub 80. On one end the flexible shaft coupling 95 connects to the generator drive shaft 15. On the other end the flexible shaft coupling 95 connects with the drive hub 80. The flexible shaft coupling flexes in a direction perpendicular to its axis of rotation as it rotates. This allows compliance between a misaligned axis of rotation of the railcar axle and the drive hub.

The generator operates as the railcar rolls on the railroad track. The rail car wheel 16, axle 19 and bolts 25 all rotate. The drive hub 80 is engaged with the railcar bolts and rotates. Since the drive hub 80 is attached to the generator 14 through generator shaft 15. The generator is also rotated which produces electricity. A connector 13 and a cable (not shown) are connected from the generator to an area inside or outside the railcar that would contain a battery and a voltage regulator. Therefore, the generator produces electricity as the railcar rolls on the railroad track.

FIG. 3 shows more details of the generator bracket. Generator bracket 30 has triangular shaped stiffening members 31 and 39, in addition to stiffening members 37 and 38. These stiffening members help to reduce the amount of deflection experienced by the generator bracket 30 as it is traveling over rough railroad track.

Figure 6:
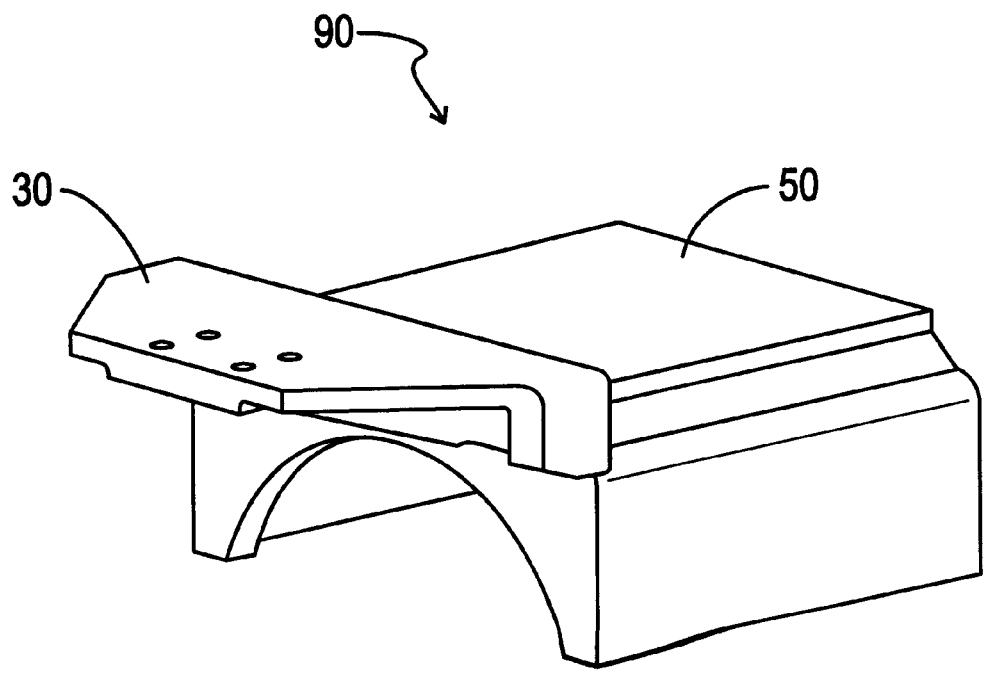
FIG. 6 is a perspective view showing the generator bracket and the drive hub fabricated as a one piece assembly, eliminating the need for the backing plate and fasteners.

FIG. 6 shows an alternative embodiment of the present invention in which the generator bracket and the drive hub are fabricated as a one piece assembly, eliminating the need for the backing plate. The generator bracket 30 and the bearing adapter 50 can be fabricated as a single assembly 90 by various methods. They could be cast as one piece or the bracket and adapter could be welded together to form a single unit. Also, another possible technique would be to tap holes in the bearing adapter itself and use bolts to secure the generator bracket to the bearing adapter. Fabricating the generator bracket and bearing adapter as a one piece assembly has several advantages. First, there are less parts required due to the elimination of the backing plate and fasteners. Second, the need for a filler material between the mounting bracket and the rough bearing adapter surface is eliminated. Third, more accurate alignment of the drive hub 80 with the bolts 25 on axle 19 is possible because the movement of fasteners 20 and 21 on steps 57 and 58 is removed.

The present invention has been described in connection with a preferred embodiment thereof, and it will be understood that many modifications and variations will be readily apparent to those of ordinary skill in the art without departing from the spirit or scope of the invention and that the invention is not to be taken as limited to all of the details herein. Therefore, it is manifestly intended that this invention be limited only by the claims and the equivalents thereof.

What is claimed is:

1. A generator mounting assembly for holding a generator adjacent to a first end of an axle, the generator mounted in relation to the axle so as to receive rotational energy from the axle as it rotates, the generator mounting assembly attached to a bearing adapter, the bearing adapter being disposed between a bearing and a sideframe, the generator producing electricity as the axle rotates comprising:

a generator bracket connected adjacent to a first side of the bearing adapter, the generator connected to the generator bracket;

a backing plate connected adjacent to a second side of the bearing adapter;

fastening means connecting the generator bracket and the backing plate to the bearing adapter, the fastening means holding the generator mounting assembly to the bearing adapter;

a drive hub connected to the generator, the drive hub adapted to engage the first end of the axle such that as the axle rotates the drive hub rotates and turns the generator.

2. The generator mounting assembly of claim 1 further comprising:

a generator shaft attached to the generator;

a flexible shaft coupling connected between the drive hub and the generator shaft, the flexible shaft coupling allowing engagement between the generator shaft and the first end of the axle when a first axis of rotation of the generator shaft is different than a second axis of rotation of the axle.

3. The generator mounting assembly of claim 1 further comprising:

the generator bracket having a first slot;

the backing plate having a second slot;

the bearing adapter having a first and a second projection, the first projection mating with the first slot and the second projection mating with the second slot.

4. The generator mounting assembly of claim 1 in which the fastening means is a first bolt and a second bolt.

5. The generator mounting assembly of claim 1 in which the drive hub has a plurality of yokes for engaging the first end of the axle, the yokes designed to allow engagement between a generator shaft connected to the generator and the first end of the axle when a first axis of rotation of the generator shaft is different than a second axis of rotation of the axle.

6. The generator mounting assembly of claim 1 in which the axle is a railroad car axle.

7. The generator mounting assembly according to claim 5 further comprising:

a plurality of axle bolts, the axle bolts connected to the first end of the axle, the yokes engaging the axle bolts.

8. A generator mounting assembly, the generator mounting assembly attached in relation to a first end of an axle so as to receive rotational energy from the axle as it rotates, the generator mounting assembly attached to a bearing adapter, the bearing adapter being disposed between a bearing and a sideframe, comprising:

a generator bracket connected adjacent to a first side of the bearing adapter;

a generator connected to the generator bracket;

a backing plate connected adjacent to a second side of the bearing adapter;

fastening means connecting the generator bracket and the backing plate to the bearing adapter, the fastening means holding the generator mounting assembly to the bearing adapter;

a drive hub connected to the generator, the drive hub adapted to engage the first end of the axle such that as the axle rotates the drive hub rotates and turns the generator, the generator producing electricity as the axle rotates.

9. The generator mounting assembly of claim 8 further comprising:

a generator shaft attached to the generator;

a flexible shaft coupling connected between the drive hub and the generator shaft, the flexible shaft coupling operable to allow engagement between the generator shaft and the first end of the axle when a first axis of rotation of the generator shaft is different than a second axis of rotation of the axle.

10. The generator mounting assembly of claim 8 further comprising:

the generator bracket having a first slot;

the backing plate having a second slot;

the bearing adapter having a first and a second projection, the first projection mating with the first slot and the second projection mating with the second slot.

11. The generator mounting assembly of claim 8 in which the fastening means is a first bolt and a second bolt.

12. The generator mounting assembly of claim 8 in which the drive hub has a plurality of yokes for engaging the first end of the axle, the yokes designed to allow engagement between a generator shaft connected to the generator and the first end of the axle when a first axis of rotation of the generator shaft is different than a second axis of rotation of the axle.

13. The generator mounting assembly of claim 8 in which the axle is a railroad car axle.

14. The generator mounting assembly according to claim 12 further comprising:

a plurality of axle bolts, the axle bolts connected to the first end of the axle, the yokes engaging the axle bolts.

15. A generator mounting assembly for holding a generator adjacent to a first end of an axle held in place by a bearing and a sideframe, the generator mounted in relation to the axle so as to receive rotational energy from the axle as it rotates, and to produce electricity as the axle rotates, the mounting assembly comprising:

a bearing adapter positioned between the bearing and the sideframe, the bearing adapter having a generator bracket extending from a first side of the bearing adapter, the generator connected to and vertically supported by the generator bracket; and a drive hub connected to the generator, the drive hub adapted to engage the first end of the axle such that as the axle rotates the drive hub rotates and turns the generator.

16. The generator mounting assembly of claim 15, wherein the axle is a railroad car axle.

17. A generator mounting assembly for holding a generator adjacent to a first end of an axle, the generator mounted in relation to the axle so as to receive rotational energy from the axle as it rotates, the generator mounting assembly being disposed between a bearing and a sideframe, the generator producing electricity as the axle rotates comprising:

a bearing adapter, the bearing adapter having a generator bracket extending from a first side of the bearing adapter, the generator connected to the generator bracket;

a drive hub connected to the generator, the drive hub adapted to engage the first end of the axle such that as the axle rotates the drive hub rotates and turns the generator;

a generator shaft attached to the generator; and a flexible shaft coupling connected between the drive hub and the generator shaft, the flexible shaft coupling operable to allow engagement between the generator shaft and the first end of the axle when a first axis of rotation of the generator shaft is different than a second axis of rotation of the axis.

18. A generator mounting assembly for holding a generator adjacent to a first end of an axle, the generator mounted in relation to the axle so as to receive rotational energy from the axle as it rotates, the generator mounting assembly being disposed between a bearing and a sideframe, the generator producing electricity as the axle rotates comprising:

a bearing adapter, the bearing adapter having a generator bracket extending from a first side of the bearing adapter, the generator connected to the generator bracket; and a drive hub connected to the generator, the drive hub adapted to engage the first end of the axle such that as the axle rotates the drive hub rotates and turns the generator, wherein the drive hub has a plurality of yokes for engaging the first end of the axle, the yokes designed to allow engagement between a generator shaft connected to the generator and the first end of the axle when a first axis of rotation of the generator shaft is different than a second axis of rotation of the axle.

19. A generator mounting assembly for holding a generator adjacent to a first end of an axle, the generator mounted in relation to the axle so as to receive rotational energy from the axle as it rotates, the generator mounting assembly being disposed between a bearing and a sideframe, the generator producing electricity as the axle rotates comprising:

a bearing adapter, the bearing adapter having a generator bracket extending from a first side of the bearing adapter, the generator connected to the generator bracket;

a drive hub connected to the generator, the drive hub adapted to engage the first end of the axle such that as the axle rotates the drive hub rotates and turns the generator, wherein the drive hub has a plurality of yokes for engaging the first end of the axle, the yokes designed to allow engagement between a generator shaft connected to the generator and the first end of the axle when a first axis of rotation of the generator shaft is different than a second axis of rotation of the axle; and a plurality of axle bolts, the axle bolts connected to the first end of the axle, the yokes engaging the axle bolts.

* * * * *